United States Patent
Hioki et al.

(10) Patent No.: US 6,489,699 B2
(45) Date of Patent: Dec. 3, 2002

(54) MOTOR WITH A SHAFT SUPPORTED BY BALL BEARINGS

(75) Inventors: Hiroshi Hioki, Tokyo (JP); Hideyuki Ishii, Tokyo (JP); Satoru Onodera, Tokyo (JP); Akira Shimizu, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/916,152

(22) Filed: Jul. 26, 2001

(65) Prior Publication Data

US 2002/0047395 A1 Apr. 25, 2002

(30) Foreign Application Priority Data

Jul. 27, 2000 (JP) ........................................ 2000-226692

(51) Int. Cl.[7] ...................... H02K 5/24; H02K 5/173; F16C 33/58
(52) U.S. Cl. ......................... 310/90; 310/91; 384/517
(58) Field of Search ......................... 310/90, 91, 42, 310/261; 384/520, 504, 535; 360/99.08, 99.04, 98.07

(56) References Cited

U.S. PATENT DOCUMENTS

| | | | | |
|---|---|---|---|---|
| 4,227,755 A | * | 10/1980 | Lundberg | 384/518 |
| 4,406,963 A | * | 9/1983 | Wolf et al. | 310/90 |
| 4,900,958 A | * | 2/1990 | Kitahara et al. | 310/90 |
| 4,980,587 A | * | 12/1990 | Yonei et al. | 310/90 |
| 5,316,393 A | * | 5/1994 | Daugherty | 384/517 |
| 5,606,475 A | * | 2/1997 | Ishizuka | 310/90 |
| 5,811,902 A | * | 9/1998 | Sato | 310/90 |
| 6,158,897 A | * | 12/2000 | Sivonen et al. | 384/518 |

FOREIGN PATENT DOCUMENTS

| | | | |
|---|---|---|---|
| JP | 05-308745 | | 11/1993 |
| JP | 07-054842 | | 2/1995 |
| JP | 09-105410 | | 4/1997 |
| JP | 2000-050563 | | 2/2000 |
| JP | 2001-197700 | | 7/2001 |
| JP | 2001-295837 | * | 10/2001 ................. 310/90 |

\* cited by examiner

*Primary Examiner*—Tran Nguyen
(74) *Attorney, Agent, or Firm*—Rankin, Hill, Porter & Clark LLP

(57) ABSTRACT

It is an object of the present invention to provide a motor having a structure so as to prevent the peeling off of adhesive for fixing the bearing. The outer ring of the second ball bearing is fitted into the second ball bearing fitting space of the bearing holder portion of the second end bracket. The annular leaf spring which gives a pressure in the direction toward the first end bracket to the outer ring of the second ball bearing is disposed in the pressure giving structure receiving space which is formed continuously to the second ball bearing fitting space. The annular leaf spring is shaped such that trough and crest portions appear alternately in the circumferential direction. The screw members are inserted into the screw holes formed in the second end bracket. The tip end portions of the screw members are arranged to abut the trough portions of the annular leaf spring.

10 Claims, 2 Drawing Sheets

MOTOR WITH A SHAFT SUPPORTED BY BALL BEARINGS

BACKGROUND OF INVENTION

1. Field of the Invention

The present invention relates to a motor having a structure in which ball bearings rotatably holding a shaft are fixed to end brackets with adhesive respectively.

2. Description of the Related Art

Conventionally, there are motors having a structure in which a shaft with a rotor member fixed thereon is held by ball bearings. In the conventional motor, a pair of ball bearings are fixed with adhesive to bearing holding portions formed in a pair of end brackets which are fixed to both ends in the axial direction of a stator body having a stator core. In the motor having this kind of structure, an outer ring of one of the bearings is arranged to move in the axial direction of a shaft while the adhesive cures in order to absorb a dimensional error of each member and absorb both an expansion and a contraction of each member during the curing of adhesive or absorb the expansion and contraction of adhesive itself. It has been conventionally considered that there is no problem with this kind of structure after curing of the adhesive.

It has been difficult, however, to minimize the variance of the application quantity of the adhesive, and sometimes peeling off of the applied adhesive layer takes place. As mentioned above, when a structure in which one of the bearing is fixed while the outer ring of the other bearing is allowed to move in the axial direction, the bearing may thrust as a result of the peeling off of the adhesive layer, resulting in the thrust movement of the shaft. Especially when a motor is used under high speed and high response conditions, and the vibration added to the motor increases, the vibration tend to cause the adhesive layer to peel off.

If the motor is provided with an optical encoder which has a rotating plate connected to a shaft of the motor, the thrust movement of the shaft causes the rotating plate of the optical encoder to move in the axial direction of the shaft. This causes miscounting of the encoder or causes the rotating plate of the encoder to touch other members in circumference. As a result, the encoder may break in the worst case. Especially the miscounting problem is a significant problem as the precision of the encoder is advanced.

It is an object of the present invention to provide a motor having a structure to prevent the peeling off of the adhesive layer for fixing the bearings.

It is another object of the present invention to provide a motor in which a bearing is allowed to move in the axial direction during the curing of adhesive while a certain pressure is given to the bearing, and yet the bearing is mechanically stopped from moving along the axial direction after the adhesive has cured.

It is still another object of the present invention to provide a small-sized motor with high capability in anti-vibration.

It is yet another object of the present invention to provide a method for manufacturing a motor having a structure to prevent the peeling off of the adhesive layer for fixing the bearings.

SUMMARY OF THE INVENTION

The motor which the present invention intends to improve comprises a stator body and a rotor. The stator body has a stator core. The rotor has a shaft and a rotor member which is fixed on the shaft and is disposed inside the stator core and yet opposite to the stator core. The motor has a first and a second end brackets which are fixed at the end portions in the axial direction of the stator body and have a bearing holder respectively. The motor has a first and a second ball bearings including an inner ring and an outer ring respectively. The inner rings are forcedly fitted onto the shaft and the outer rings are joined to the respective bearing holder portion of the end bracket with adhesive. Generally, the stator core is provided with stator windings, and permanent magnets are used as the rotor member. The ball bearing comprises, in general, an inner ring, an outer ring, and a plurality of rolling members disposed between the inner ring and the outer ring. In a typical structure, the shaft is provided with a first and a second abutting portions (or step portions) which abut the inner rings of the first and the second ball bearing to prevent the inner rings of the first and the second ball bearings from moving toward each other.

The bearing holder portion of the first end bracket is so constructed that the first ball bearing may be prevented from moving mechanically in the axial direction with respect to the first end bracket. More particularly, the bearing holder portion for the first ball bearing comprises a first ball bearing fitting space into which the first ball bearing is fitted and a bearing coming-off preventing structure which prevents the first ball bearing fitted into the first ball bearing fitting space from coming off.

In the present invention, the bearing holder portion of the second end bracket is formed with a second ball bearing fitting space into which the outer ring of the second ball bearing is fitted and a pressure-giving structure receiving space formed continuously to the second ball bearing fitting space and receiving a pressure-giving structure which gives a pressure to the outer ring of the second ball bearing toward the first end bracket. And a spring member is used as a pressure-giving structure. For example, a leaf spring may be used as the spring member. The leaf spring may have an annular form in which crests (or tops) and troughs (or bottoms) alternately appear along the outer ring of the second ball bearing. When such an annular leaf spring is used, the spring is disposed in a compressed state between the outer ring of the second ball bearing and the inner wall surface of the second end bracket. With the annular leaf spring, it is easy to set a spring member in a predetermined position and furthermore it is possible to give an almost balanced pressure to the second ball bearing, thus the assembly precision of the motor can be increased.

Moreover, in the present invention, the second end bracket is provided with a stopper which allows the outer ring of the second ball bearing to move in such a direction as to compress the spring member during the curing of adhesive, but prevents the outer ring of the second ball bearing from giving pressure to the spring member after the adhesive has cured. Adhesive may be any type as far as a given joint strength is acquired. From the manufacturing point of view, however, heat curing adhesive is generally used. During the manufacturing of a motor, the spring member absorbs variance in working precision of the shaft, the first and the second ball bearings as well as the first and the second bearing holder portions by changing the shape of the spring member. Also the spring member absorbs an expansion and a contraction of the adhesive and parts during the curing of the adhesive. After the adhesive has cured, the spring member does not have any specific function. If peeling off of the adhesive layer takes place due to vibrations and the like after the adhesive layer has been formed as a result of the curing of the adhesive, the moving of the second ball bearing may be curbed a little because of the presence of this spring member. However, the spring member only cannot prevent the second ball bearing from moving in the axial direction after the peeling off of the adhesive layer. After the curing of the adhesive, the stopper having the function as mentioned above, will prevent the outer ring of the second ball bearing from moving in such a direction as to compress the spring member. Thus the second ball bearing can be prevented from moving much in the axial direction due to the presence of the stopper, even if the adhesive layer has peeled off. When an encoder or the like is mounted on the shaft of the motor, the above-mentioned structure will prevent encoder's poor performance in measuring precision or breakage of the encoder due to the moving of the shaft in the axial direction.

For the stopper having the function mentioned above, many kinds of things may be used. For example, when an annular leaf spring is used as the spring member, the stopper may consist of more than one screw holes which extend through the second end bracket in the axial direction toward the second ball bearing and more than one screw members which are inserted into the screw holes and whose tip end portions abut the trough (or bottom) portions of the leaf spring or the outer ring of the second ball bearing. When this kind of configuration is adopted, the screw members are loosened (or removed) until the adhesive cures. After the adhesive has cured, by tightening the screw members to let the tip end portions of the screw members abut the trough (or bottom) portions of the leaf spring or the outer ring of the second ball bearing, the moving of the second ball bearing in the axial direction can be prevented. When screw members are used as the stopper, it is possible to adjust the pressure given by the screw members to the second ball bearing in order to prevent too much pressure from being given to the second ball bearing with the screw members. Especially when the tip end portions of screw members are arranged to abut the troughs (or bottoms) of the annular leaf spring, it is possible by using screw members to give pressure to the outer ring of the bearing through the leaf spring, even if the outer ring of the bearing used in a motor is small due to the miniatuarization of the motor. Also it is a merit of such a structure that the leaf spring can serve as a buffer member. Furthermore, an engaging projection can be provided with either one of the inner periphery of the end bracket surrounding the pressure-giving structure receiving space and the annular leaf spring. Also an engaged portion such as a fitting groove or the like to be engaged with the engaging projection can be provided with the other of the inner periphery surrounding the pressure-giving structure receiving space and the annular leaf spring. The leaf spring can be positioned easily through engaging of the engaging projection and the engaged portion, resulting in an easy matching of the trough (or bottom) portions of the leaf spring and the screw holes. It is noted that other positioning structures may be used as well. In respect of a large-sized motor, tip end portions of the screws need not be arranged to abut the trough (or bottom) portions of the leaf spring. In this case, the tip end portions of the screw members may be arranged only to abut the outer ring of the bearing. A means for positioning the leaf spring is not necessary in this case.

One screw member can be used as a stopper. However if more than one screw members are used as a stopper, it is possible to prevent the moving of the second bearing more surely. In this case, it is preferable that the screw holes are arranged so as to surround a shaft through hole (or a through hole for the shaft) at almost equal interval in the circumference of the shaft. This construction allows a substantially equal pressing force to be applied to the second ball bearing from the trough portions of the leaf spring, resulting in that the moving of the second ball bearing is prevented, even when the adhesive layer has peeled off.

The stopper may also comprise through holes which extend through the second end bracket in the axial direction toward the first end bracket and more than one pin members which are forcedly fitted into the through holes and whose tip end portions abut either the trough (or bottom) portions of the leaf spring or the outer ring of the second ball bearing. When pin members are used, the pressing force may be set by initially deciding the length of the pin members which can provide a desired pressing force. To prevent pin members from coming off, either the pin members or the through holes may be tapered in such a manner that the radial dimension of either the pin members or the through holes become smaller toward the second bearing.

When the stopper comprises screw members or pin members and the screw holes or through holes and a leaf spring is used as a spring member, the motor will be manufactured as described in the following. After fixing the first end bracket to the stator body, uncured adhesive is applied between the inner periphery surrounding the first ball bearing fitting space in the first end bracket and outer surface of the outer ring of the first ball bearing, and the ball bearing coming-off preventing structure is set to work. Next, an annular leaf spring is arranged in a compressed state between the outer ring of the second ball bearing and the inner periphery of the second end bracket, and uncured adhesive is applied between the inner periphery of the second end bracket surrounding the second ball bearing fitting space and the outer surface of the outer ring of the second ball bearing. In this condition the second end bracket is fitted to the stator body. After uncured adhesive has cured, more than one screw members or pin members are inserted into screw holes or through holes to be fixed and the tip end portions of such screw members or pin members are arranged to abut trough (or bottom) portions of the leaf spring of the second ball bearing.

DETAILED DESCRIPTION OF THE PREFERRED EMBODIMENTS

Figure 1B:
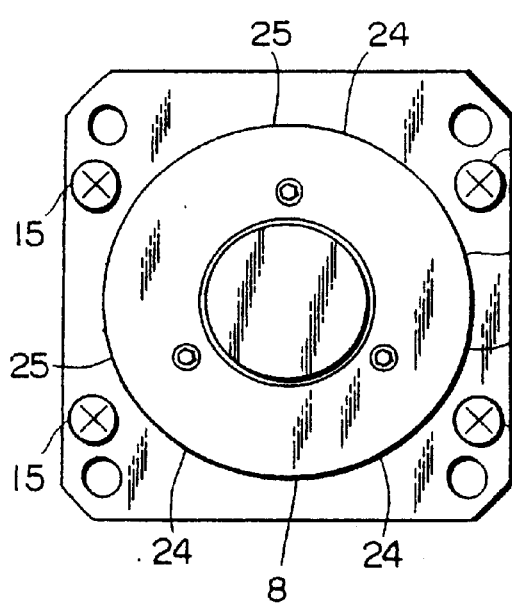
FIG. 1B is a left side elevation view of the motor in FIG. 1A.
Figure 1A:
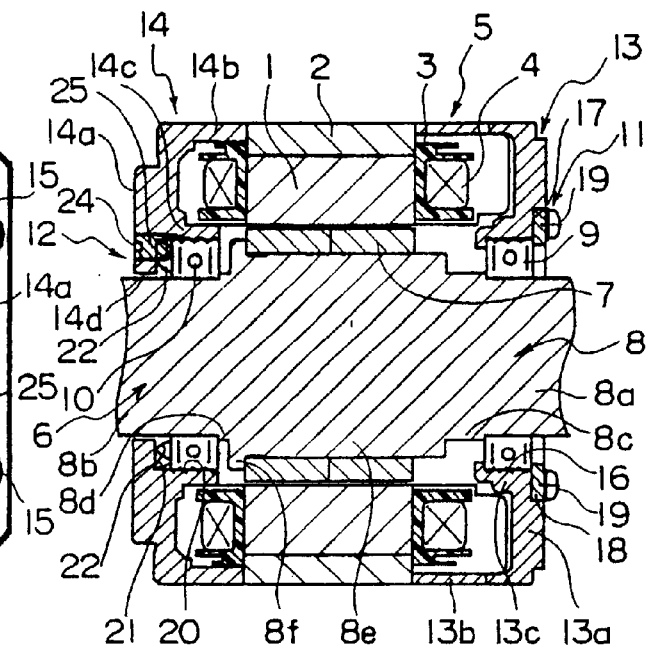
FIG. 1A is a vertical section of the motor of the present invention.

Referring to the drawings, an example of an embodiment of the present invention will be described in detail. FIG. 1A shows a vertical section of a motor of the present invention and FIG. 1B is a left side elevation view of the motor shown in FIG. 1. The motor in this embodiment has a stator core 1 and a cylindrical case 2 fitted onto the outer periphery of the stator core1. The stator core 1 has a structure in which a plurality of projecting magnetic poles are arranged on the inner periphery of an annular yoke with a given interval in the circumferential direction. The motor has an insulator 3 and a plurality of windings 4. The insulator 3 is fitted with the stator core 1 and electrically insulates electric conductive wires wound around magnetic poles projecting from stator core 1. A plurality of windings 4 are formed with conductive wires wound around the projecting magnetic poles through insulator 3. A stator body 5 comprises the stator corel, cylindrical case 2, insulator 3, the windings 4. In some motors, the case body 2 is not used and the stator core 1 is exposed. Rotor 6 comprises a rotor member 7 and a shaft 8. The rotor member 7 has permanent magnets disposed inside the stator corel and opposite to magnetic pole surfaces of the plurality of projecting magnetic poles. The rotor member 7 is fixed on the shaft 8.

The shaft 8 is rotatably supported by a first and a second ball bearings 9 and 10. The first and the second ball bearings 9 and 10 have a structure in which a plurality of rolling members such as balls are disposed between an inner ring and an outer ring. The shaft 8 comprises six cylindrical portions 8a to 8f. The first and the second cylindrical portions 8a and 8b are forcedly fixed into the inner rings of the first and the second ball bearings 9 and 10 or are fixed in the ball bearings with adhesive. The third and the fourth cylindrical portions have radial dimensions larger than those of the first and the second cylindrical portions 8a and 8b to form abutting or step portions with which the inside end surfaces of the first and the second ball bearings abut. The fifth cylindrical portion 8e has a radial dimension larger than that of the third cylindrical portion 8c and is provided with the permanent magnets constituting rotor member 7. The sixth cylindrical portion 8f has a radial dimension larger than that of the cylindrical portion 8e and is used for positioning the permanent magnets constituting rotor member 7. In FIG. 1A, the first and the second cylindrical portions 8a and 8b are partially shown. In this embodiment a shaft of an encoder, to which a rotating plate of an optical encoder (not shown) is fixed, is connected to the end portion of the first cylindrical portion 8a.

A first and a second end bracket 13 and 14 are fixed at both ends in the axial direction of the cylindrical case 2 of the stator 5. These end brackets have a first and a second bearing holder portions 11 and 12 at which the first and the second ball bearings 9 and 10 are held. As shown in FIG. 1B, the first and the second end bracket 13 and 14 are fixed to the cylindrical case 2 with four screws 15. The cylindrical case 2 are formed with screw holes into which screws are inserted.

The first and the second end brackets 13 and 14 are formed with a shaft through hole through which a shaft 8 extends. The end brackets 13 and 14 comprise side wall portions 13a and 14a which extend in a direction perpendicular to the axial direction, and cylindrical peripheral wall portions 13b and 14b which extend from the outer periphery of the side wall portions 13a and 14a. At the center of the side wall portions 13a and 14a, cylindrical boss portions 13c and 14c are integrally provided.

The first bearing holder portion 11 for holding the first ball bearing 9 is formed at a boss portion 13c which is disposed in the center of the first end bracket 13. The first bearing holder portion 11 has a first ball bearing fitting space 16 into which the first ball bearing 9 is fitted and a bearing coming-off preventing structure which prevents the outer ring of the first ball bearing 9 fitted into the first ball bearing fitting space 16 from coming off. In this embodiment, the bearing coming-off preventing structure is formed such that an annular plate 18 is fitted in the annular step formed in the side wall portion 13a, and the annular plate 18 is then fixed to the first end bracket 13 with a plurality of screws 19. The outer peripheral surface of the outer ring of the first ball bearing 9 is joined to the walls surrounding the first ball bearing fitting space 16 with heat curing adhesive whose major material is heat-hardening resin such as epoxy resin. The dimension of the first ball bearing fitting space 16 is substantially the same as the dimension of the contour of the outer ring of the first ball bearing 9. When the annular plate 18 is fixed to the end bracket 13, the first ball bearing 9 is substantially prevented from moving in the axial direction.

The second bearing holder portion 12 is formed at a boss portion 14c of the second end bracket 14. The second bearing holder portion 12 has a second ball bearing fitting space into which the outer ring of the second ball bearing is fitted and a pressure giving structure receiving space 21 which is formed continuously to the second ball bearing fitting space 21. An annular leaf spring (spring member) as a pressure giving structure for giving a pressure to the outer ring of the second ball bearing 10 toward the first end bracket 13 is received in the pressure giving structure receiving space 21. The second ball bearing fitting space 20 and the pressure giving structure receiving space 21 have the same inner dimensions. Therefore, when the outer ring of the second ball bearing is joined to the peripheral wall surrounding the second ball bearing fitting space with adhesive, the second ball bearing can move in the axial direction (in a direction to press the leaf spring 22) until the adhesive completely cures.

Figures 2A, 2B:
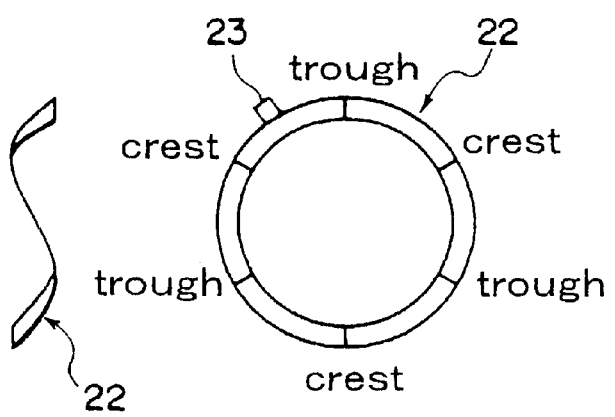
FIG. 2A is a plan view of an annular leaf spring.
FIG. 2B is a side elevation view of FIG. 2A.
Figure 3:
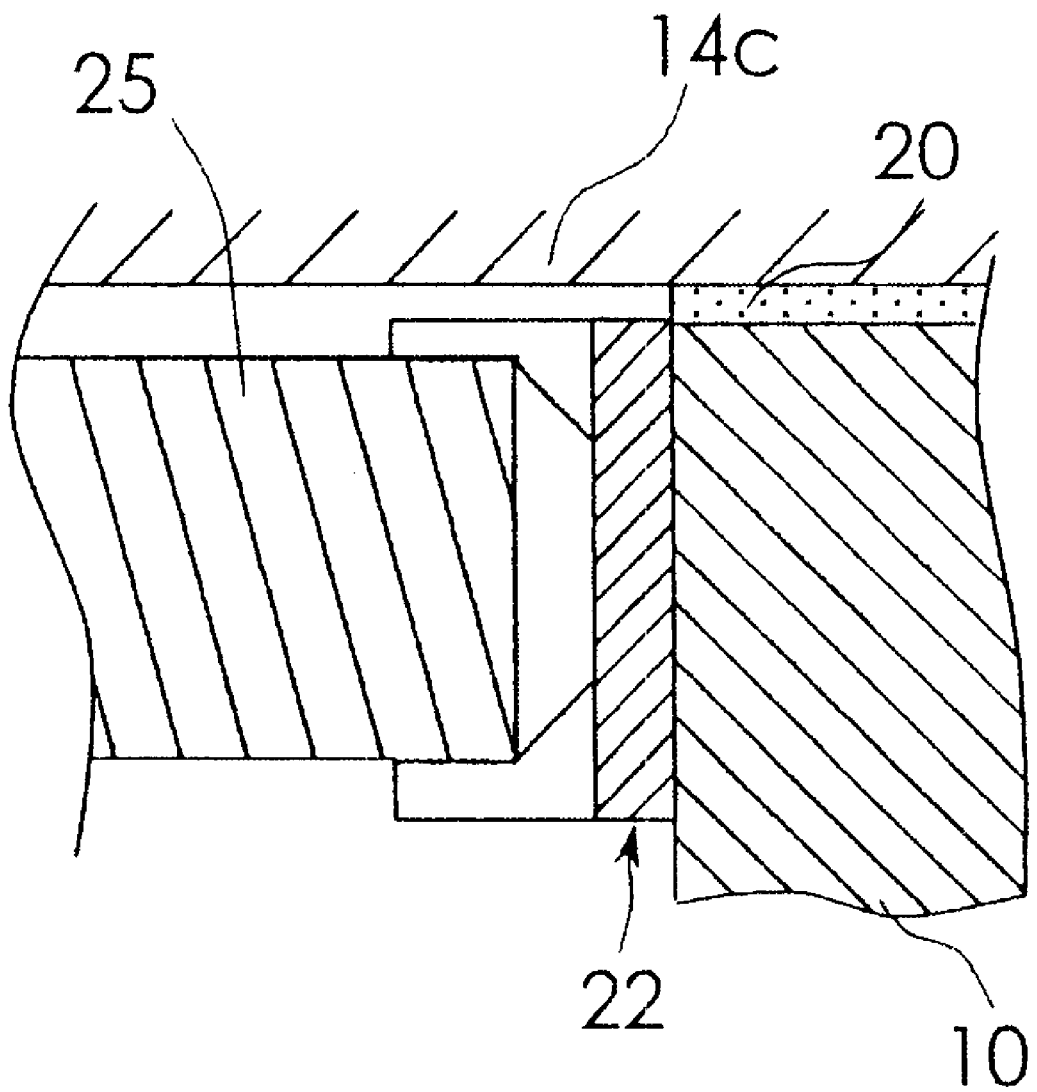
FIG. 3 is an enlarged view of a portion of the section of FIG. 1, showing details of a spring element, outer race, adhesive, and stopper according to the present invention.

As shown in FIGS. 2A and 2B the annular leaf spring 22 is structured so that crest (or top) portions and trough (or bottom) portions appear with 60° interval in a circumferential direction along the outer ring of the second ball bearing 10. FIG. 2A is a plan view of the annular leaf spring 22 and FIG. 2B is a side elevation view of the FIG. 2A. To be easily understood, straight lines are added to the crest (or top) portions and the trough (or bottom) portions in FIG. 2A. As shown in FIG. 2A, an engaging projection 23 is integrally provided at the outer periphery of the leaf spring 22. The leaf spring 22 is received in the pressure giving structure receiving space 21 in a compressed state between an end surface in the axial direction of the outer ring of the second ball bearing 10 and the inner periphery of the side wall portion 14a of the second end bracket 14. An engaged recess (not shown) to which the engaging projection 23 of the leaf spring 22 is engaged is formed in the inner periphery of the second end bracket 14. The leaf spring 22 is positioned by engaging the engaging projection 23 to the engaged recess. Three screw holes 24 are formed through the second end bracket 14 with 120° interval in the circumferential direction around the shaft through hole through which the shaft extends. These three screw holes 24 extend through the side wall portion 14a of the second end bracket 14 in the axial direction toward the second ball bearing 10.

When the leaf spring 22 is positioned by the engaging projection 23, the three trough portions align with the three screw holes. The three screw members 25 are inserted into the three screw holes 24 and the tip end portions of the three screw members 25 abut the trough (or bottom) portions of the leaf spring 22. The heads of the three screw members 25 have a hexagonal recess respectively to which a hexagonal wrench is fitted. In this embodiment, the screw holes 24 and screw members 25 constitute a stopper. The stopper allows the outer ring of the second ball bearing 10 to move in a direction to compress the leaf spring (spring member) 22 before the adhesive applied and filled between the outer surface of the second ball bearing 10 and the second end bracket cures, but prevents the outer ring of the second ball bearing 10 from moving in the direction to compress the leaf spring 22 after the adhesive has cured.

When this kind of stopper is used, the screw members 25 are loosened (or removed) before the adhesive cures. The screw members 25 are tightened so as to make the tip end portions of the screw members 25 abut the trough (or bottom) portions of the leaf spring 22 after the adhesive has cured. It is possible to prevent the second ball bearing 10 from changing the position or moving in the axial direction even after the adhesive has peeled off. As in this embodiment, when such a structure that the tip end portions of the screw members 25 are arranged to abut the trough (or bottom) portions of the leaf spring 22 is adopted, it is still possible to give an outer force through the leaf spring 22 to the outer ring of the ball bearing 10 for preventing the moving even if the radial dimension of the second ball bearing 10 becomes smaller due to the miniaturization of the motor. Also as the leaf spring serves as a buffer, the outer ring of the ball bearing 10 does not get damaged by directly abutting the end portions of the screw members 25.

In the above embodiment, the engaging projection 23 is provided to the leaf spring 22. It is also possible to provide an engaging projection to the peripheral portion surrounding the pressure giving structure receiving space 21 and to provide an engaged recess to be fitted with the engaging projection to the leaf spring 22.

In the above embodiment, the tip end portions of the screw members 25 are arranged to abut the trough (or bottom) portions of the annular leaf spring 22. However, it is not necessary to arrange the tip end portions of the screw members 25 to abut the trough (or bottom) portions of the leaf spring 22 when the dimension of the motor is larger, and the tip end portions of the screw members 25 may be arranged to directly abut the outer ring of the second ball bearing 10. In this case it is not necessary to provide the engaging projection 23 for positioning the leaf spring 22.

In the above embodiment, the stopper comprises screw members. However, the stopper may comprise more than one through holes which extend through the second end bracket in the axial direction toward the first end bracket and pin members which are forced into the through holes and whose tip end portions are arranged to abut the trough (or bottom) portions of the leaf spring or to directly abut the outer ring of the second ball bearing.

How to produce a motor using a stopper consisting of screw members 25 and screw holes 24 and an annular leaf spring 22 as mentioned above as a spring member will be described in the following. First of all, the first end bracket 13 is fixed to the stator core 1. Then uncured heat curing adhesive is applied between the inner wall surrounding the first ball bearing fitting space 16 of the first end bracket 13 and the outer surface of the outer ring of the first ball bearing 9. In addition the bearing coming-off preventing structure (18) is set to work. Then the annular leaf spring 22 is set in a compressed state between the outer ring of the second ball bearing 10 and the inner periphery of the side wall portion 14a of the second end bracket 14. Then uncured heat curing adhesive is applied between the inner periphery surrounding the second ball bearing fitting space of the second end bracket 14 and the outer surface of the outer ring of the second ball bearing. In the above mentioned condition, the second end bracket is fixed to the stator core 1. Next, half-manufactured motors produced in the above mentioned way are put in an oven, and let the uncured heat curing adhesive cure. After that, more than one screw members or pin members are inserted into more than one screw holes or through holes to be fixed, and the tip end portions of the screw members or pin members are arranged to abut the trough (or bottom) portions of the leaf spring of the second ball bearing. In this way motors can be manufactured easily.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A motor comprising:
   a stator body having a stator core,
   a rotor having a rotor member disposed inside and opposite to said stator core and a shaft on which said rotor member is fixed,
   a first and a second end brackets fixed at the end portions in the axial direction of said stator body, said first and a second end brackets having a bearing holder portion respectively,
   a first and a second ball bearings having an inner ring and an outer ring respectively, said inner rings being forcedly set onto the shaft and said outer rings being joined with corresponding said bearing holder portions of said end brackets with adhesive,
   said bearing holder portion of said first end bracket being so constructed that said first ball bearing is prevented from moving mechanically in said axial direction with respect to said first end bracket,
   said bearing holder portion of said second end bracket being formed with a bearing fitting space into which said outer ring of said second ball bearing is fitted and a pressure giving structure receiving space which is formed continuously to said bearing fitting space for receiving a pressure giving structure to give pressure in the direction toward said first end bracket to said outer ring of said second ball bearing,
   said pressure giving structure comprising a spring member, and
   said second end bracket being provided with a stopper which allows said outer ring of said second ball bearing to move in a spring-compressing direction to compress said spring member before said adhesive cures, but prevents said outer ring of said second ball bearing from moving in the spring-compressing direction to compress said spring member after said adhesive has cured.

2. A motor as defined in claim 1, wherein said spring member comprises an annular leaf spring having such a shape as crest portions and trough portions appear alternately along said outer ring of said second ball bearing, said annular leaf spring being disposed in a compressed state between said outer ring and the inner peripheral surface of said second end bracket.

3. A motor as defined in claim 1, wherein said stopper comprises more than one screw holes which extend through said second end bracket in said axial direction and more than one screw members which are screwed into said more than one screw holes, wherein tip end portions of more than one screws abut one of said outer ring of said second ball bearing and said trough portions of said leaf spring.

4. A motor as defined in claim 3, wherein said screw holes are formed with almost equal interval in the circumferential direction around said shaft through hole.

5. A motor as defined in claim 1, wherein said stopper comprises more than one through holes which extend through said second end bracket toward said first end bracket and more than one pin members which are forcedly fitted into said more than one through holes, wherein tip end portions of more than pin members are arranged to abut one of said outer ring of said second ball bearing and said trough portions of said leaf spring.

6. A motor comprising:

a stator body having a stator core and a stator winding, a rotor having a rotor member and a shaft on which said stator core is fixed, said rotor member disposed in side said stator core and having permanent magnets disposed opposite to said stator core, a first and a second end brackets fixed at the end portions in the axial direction of said stator body, said first and a second end brackets having a bearing holder portion respectively, a first and a second ball bearings having an inner ring, an outer ring and a plurality of roller members disposed between said inner ring and said outer ring respectively, said shaft being forcedly fitted into said inner rings, and said outer rings being joined with corresponding said bearing holder portions of said end brackets with adhesive, said shaft being provided with a first and a second abutting sections which abut said inner rings of said first and second ball bearings so as to prevent said inner rings of said first and second ball bearings from moving toward each other, said bearing holder portion of said first ball bearing having a first ball bearing fitting space into which said first ball bearing is fitted and a bearing coming-off preventing structure which prevents said first ball bearing fitted into said first ball bearing fitting space from coming off said first ball bearing fitting space, said bearing holder portion of said second end bracket being provided with second ball bearing fitting space into which said outer ring of said second ball bearing is fitted, a pressure giving structure receiving space which is formed continuously to said second ball bearing fitting space and in which a pressure giving structure for giving pressure in the direction toward said first end bracket to said outer ring of said second ball bearing is received, and a shaft through hole which is formed continuously to said pressure giving structure receiving space and through said pressure giving structure said shaft extends, said pressure giving structure comprising spring member, and said second end bracket being provided with a stopper which allows said outer ring of said second ball bearing to move in a spring-compressing direction to compress said spring member before said adhesive cures, but prevents said outer ring of said second ball bearing from moving in the spring-compressing direction to compress said spring member after said adhesive has cured.

7. A motor as defined in claim 6, wherein, said spring member comprises an annular leaf spring having such a shape as crest portions and trough portions appear alternately along said outer ring of said second ball bearing, said annular leaf spring being disposed in a compressed state between said outer ring and the inner peripheral surface of said second end bracket.

8. A motor as defined in claim 6, wherein said stopper comprises more than one screw holes which extend through said second end bracket in said axial direction and more than one screw members which are screwed into said more than one screw holes, wherein tip end portions of more than one screws abut one of said outer ring of said second ball bearing and said trough portions of said leaf spring.

9. A motor as defined in claim 8, wherein said screw holes are formed with almost equal interval in the circumferential direction around said shaft through hole.

10. A motor as defined in claim 6, wherein said stopper comprises more than one through holes which extend through said second end bracket toward said first end bracket and more than one pin members which are forcedly fitted into said more than one through holes, wherein tip end portions of more than one pin members are arranged to abut one of said outer ring of said second ball bearing and said trough portions of said leaf spring.

* * * * *